United States Patent [19]

Freitag et al.

[11] 4,211,594
[45] Jul. 8, 1980

[54] JOINING TOGETHER SHAPED BODIES OF POLYTETRAFLUOROETHYLENE

[75] Inventors: Günter Freitag, Frankfurt am Main; Alfred Krahl, Eschborn; Gerhard Ullmann, Gross-Gerau; Günter Wenzel, Kelkheim, all of Fed. Rep. of Germany

[73] Assignee: Sigri Elektrographit Gesellschaft mit Beschränkter Haftung, Meitingen bei Augsburg, Fed. Rep. of Germany

[21] Appl. No.: 867,773

[22] Filed: Jan. 9, 1978

Related U.S. Application Data

[63] Continuation of Ser. No. 733,073, Oct. 18, 1976, abandoned.

[30] Foreign Application Priority Data

Nov. 5, 1975 [DE] Fed. Rep. of Germany ....... 2549571

[51] Int. Cl.² .................... B65H 69/08; B29D 23/01; B32B 31/20
[52] U.S. Cl. .................................. 156/158; 156/157; 156/304.3; 156/308.2; 156/311
[58] Field of Search ............... 156/157, 158, 304, 306, 156/309, 311, 498, 502, 159, 333

[56] References Cited

U.S. PATENT DOCUMENTS

| | | | |
|---|---|---|---|
| 3,356,551 | 12/1967 | Glenn et al. | 156/158 X |
| 3,468,732 | 9/1969 | Hewitt | 156/304 X |
| 3,727,289 | 4/1973 | Bemelmann et al. | 156/304 X |
| 3,865,662 | 2/1975 | Segal | 156/304 X |

FOREIGN PATENT DOCUMENTS

2163420 7/1973 France .

Primary Examiner—John T. Goolkasian
Assistant Examiner—Thomas Bokan
Attorney, Agent, or Firm—Herbert L. Lerner

[57] ABSTRACT

Method and apparatus for joining together edge surfaces of polytetrafluoroethylene material by a butt joint in which abutting surfaces of the material are placed in a chamber bounded by clamps along the abutting surfaces which press together the abutting surfaces, and heating elements in the space between the clamps to heat both sides of the material between the clamps, the boundaries of the chamber inhibiting the volume expansion of the material resulting from heating. Pressure generated in chamber may be controlled by moving a heating element. Additional pressure during cooling-down is exerted on the butt joint by moving one clamping in the direction of the butt joint. A thin foil of a fluorine-containing thermoplastic inserted between the abutting surfaces facilitates joining of the surfaces.

1 Claim, 4 Drawing Figures

JOINING TOGETHER SHAPED BODIES OF POLYTETRAFLUOROETHYLENE

This is a continuation of application Ser. No. 733,073, filed Oct. 18, 1976 now abandoned.

CROSS REFERENCE TO RELATED APPLICATION

Our cofiled application Ser No. 733,081, filed Oct. 18, 1976 now abandoned and refiled as a continuation on Jan. 6, 1978 as Ser. No. 867,533 owned by the assignee of the present application, relates to joining together edge surfaces of polytetrafluoroethylene by a butt joint by clamping the polytetrafluoroethylene on each side of the abutting surfaces except for a narrow unclamped strip along the abutting surfaces, pressing-together the abutting surfaces, applying radiant or convection heat to the narrow strip by heating means out of direct contact with the strip, heating to a temperature above 327° C., removing heat from the clamping zone via the clamping, and continuing heating and pressing together to effect joining of the abutting surfaces. In the present invention the polytetrafluoroethylene edges to be joined in abutting relationship are confined in a chamber defined as an upper heating element and a lower heating element, respectively, above and below a strip of the polytetrafluoroethylene along both sides of the abutting surfaces, a clamping jaw on each side of the abutting surfaces, heating the abutting surfaces and subjecting the heated polytetrafluoroethylene to pressure within the chamber.

BACKGROUND OF THE INVENTION

1. Field of the Invention

This invention relates to a method and apparatus for joining together shaped bodies of polytetrafluoroethylene by a butt joint.

2. Description of the Prior Art

Shaped parts which consist of polytetrafluoroethylene (PTFE) or contain predominantly PTFE hereinafter designated polytetrafluoroethylene material are increasingly used as corrosion-resistant linings, as for example, for chemical apparatus such as heat exchangers, columns and vessels, because of their excellent thermal and chemical stability. In this connection, since fabrication of PTFE tubes of large diameter is not possible by ram or paste extrusion, it is necessary, particularly for equipment with a large inside diameter, to join together shaped parts, e.g., plates or foil to make them gas-and liquid-tight. Further difficulties are due to the fact that a separate press orifice is necessary for every diameter, and the ratio of wall thickness to diameter can be varied only within certain limits.

It has also not been possible to date to make cemented joints with a quality required, for example, for chemical apparatus, particularly with high thermal and chemical stability, because of the poor wettability of polytetrafluoroethylene and the comparatively low thermal and chemical stability of adhesives. Even if the PTFE surfaces to be joined together are first etched, the quality of the joint is not sufficient for the application mentioned. The welding methods commonly used for joining together conventional plastic materials, in which the pressed-together parts are heated above the melting or softening point, are not usable for polytetrafluoroethylene. However, overlapping joints between thin PTFE foils have been made by this method, but are not well suited for tank linings because of the extra material thickness at the overlap. The sealing of such seams, for example, as flanges, is particularly difficult and expensive if thicker foil or plates are used. Attempts to avoid such overlap points have been made according to the French Patent Application 2,163,420 by a method for making a joint between PTFE parts by a butt joint, in which the V-shaped seam gap between two PTFE plates fixed on a support is filled with a PTFE powder and the latter is heated by heating elements of stamp-like design, which are pressed on the joint. Sufficient and reproducible welding quality which depends, among other factors, on the quality and grain of the powder as well as on the packing density in a complicated manner, can be achieved by this process only if all the factors influencing the operation are obtained, which is hardly possible under normal operating conditions. The asymmetrical temperature distribution in the material to be welded, caused by the arrangement of the support underneath the weld results in unfavorable welding quality.

SUMMARY OF THE INVENTION

An object of the present invention is to provide a method for making a butt joint of high welding quality suitable for shaped bodies of PTFE of any thickness and size. Efficient apparatus for carrying out the joining method is disclosed.

With the foregoing and other objects in view, there is provided in accordance with the invention method for joining together edge surfaces of polytetrafluoroethylene material by a butt joint, which includes placing the polytetrafluoroethylene edges to be joined in abutting relationship in a chamber defined as an upper heating element above a strip of the polytetrafluoroethylene material along both sides of the abutting surfaces, a lower heating element below the strip of polytetrafluoroethylene material along both sides of the abutting surfaces, and a clamping jaw on each side of the abutting surfaces holding the polytetrafluoroethylene material adjacent the strip of material between the upper and lower heating elements, pressing together the abutting surfaces, heating the abutting surfaces to a temperature above the melting temperature of the polytetrafluoroethylene, and subjecting the heated polytetrafluoroethylene to pressure within the chamber.

BRIEF DESCRIPTION OF THE DRAWING

Other features which are considered as characteristic for the invention are set forth in the appended claims.

Although the invention is illustrated and described herein as embodied in joining together shaped bodies of polytetrafluoroethylene, it is nevertheless not intended to be limited to the details shown, since various modifications may be made therein without departing from the spirit of the invention and within the scope and range of equivalents of the claims.

Figure 1:
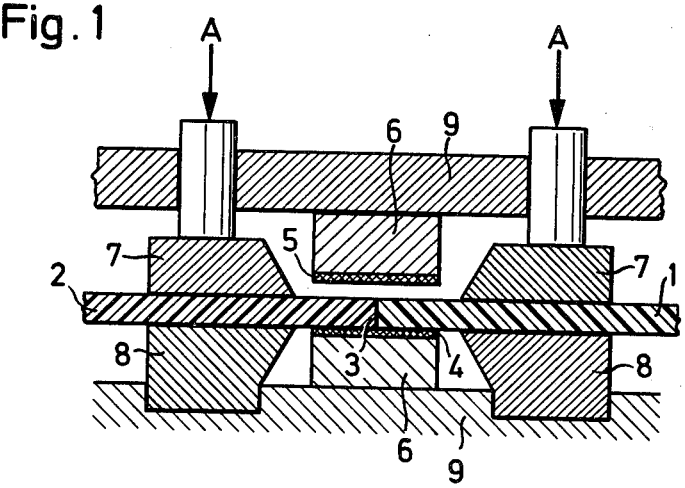
Figure 2:
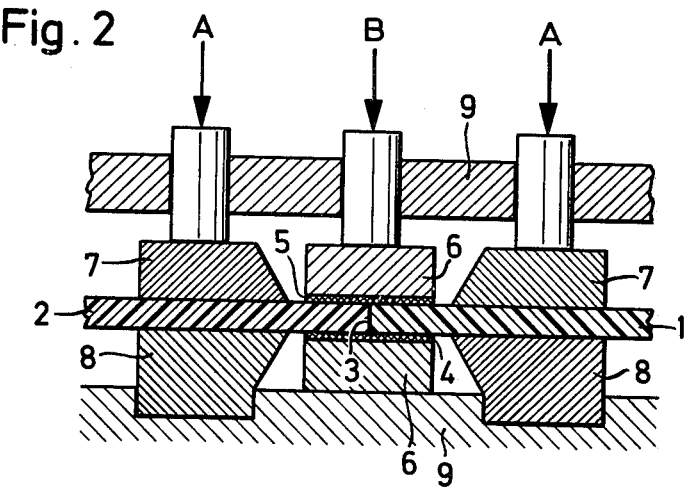
Figure 3:
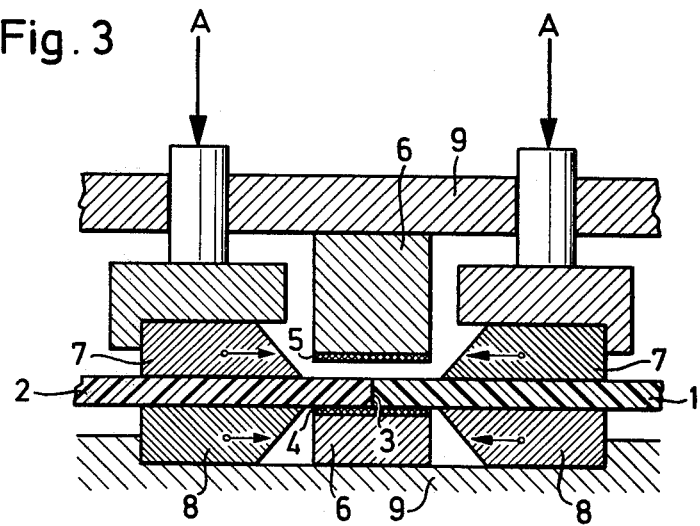
Figure 4:
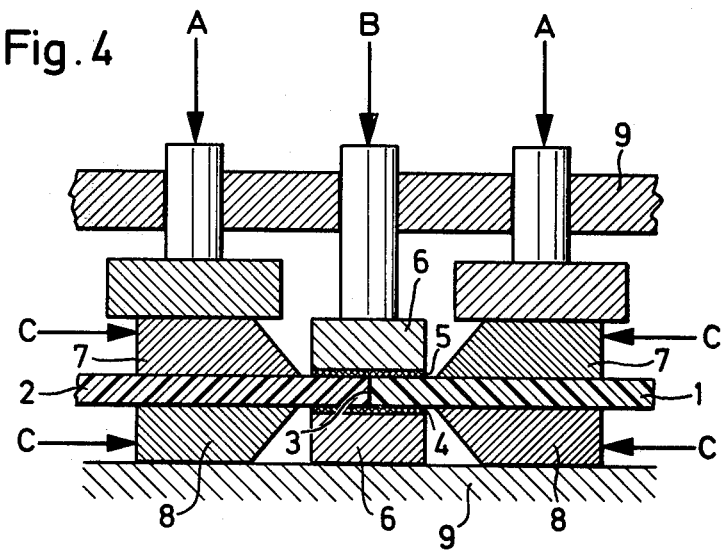

The construction and method of operation of the invention, however, together with additional objects and advantages thereof will be best understood from the following description when read in connection with the accompanying drawing, in which:

FIG. 1 diagrammatically illustrates a cross sectional view through a welding device with rigid clamping;

FIG. 2 shows a cross sectional view through a welding device with a movable heating element;

FIG. 3 shows a cross sectional view through a welding device with movable clamping jaws; and FIG. 4 shows a cross sectional view through a welding device with a movable heating element and movable clamping jaws.

DETAILED DESCRIPTION OF THE INVENTION

The abutting surfaces of the polytetrafluoroethylene bodies to be joined together are held centered in a chamber defined by heating elements with the cold part of the bodies held by clamping jaws. The abutting surfaces are heated to a temperature above the melting temperature of the polytetrafluoroethylene, and a pressure is generated within the chamber.

To produce a high-quality butt joint, it is necessary to heat the abutting surfaces, while stressed in compression, to a temperature above the crystallite melting point and to let temperature and pressure act on the abutting surfaces for a certain length of time. Under these conditions, particularly if higher temperatures and/or pressures are used, thermoplastic materials have the tendency to flow or drip out of the melted portion of the weld. Flowing out is avoided, surprisingly, in accordance with the invention, by compartmentalization of the melting zone which is subjected to compression stresses. The clamping jaws that hold the cold sections of the PTFE bodies and the heating elements that heat the butt surfaces act as chamber walls. The simple compartmentalization also makes it possible to maintain the contact pressure over the necessary welding time and prevents buckling or bulging of the PTFE sections which protrude unsupported between the clamping jaws.

The pressure in the chamber is preferably generated by the expanding PTFE which braces itself against the chamber walls. For setting on changing pressure or for controlling the pressure during the welding process, it is advantageous to move at least one mechanically supported heating element against a force or to move at least one clamping jaw in a direction substantially perpendicular to the abutting surfaces against a force; both measures may be taken simultaneously or sequentially.

In another preferred embodiment, the abutting surfaces are heated to a temperature between 340° and 430° C. Below this temperature range, the required welding times are relatively long. Above this range, very short welding times can be obtained, but the danger of partial decomposition of the heated polytetrafluoroethylene increases. The contact pressure and the welding time are preferably 60 to 300 N/cm$^2$ and 10 to 120 min., respectively. The parameters temperature, pressure and time have a similar effect up to a certain degree and a low value of one parameter can be compensated in this substitution range by an increase of the other parameters. A shortening of the welding time and lowering of the welding temperature and the pressure can be achieved, in accordance with the invention, by inserting films of fluorine-containing thermoplastic into the gap between the abutting surfaces, e.g., by films of tetrafluoroethylene-hexafluoropropylene- (FEP) or tetrafluoroethylene-perfluoroalkyl-perfluorovinyl ether (PFA) copolymerisates. The welding time and the welding pressure under these conditions are preferably 1 to 10 min. and 2 to 100 N/cm$^2$, respectively. The chemical and thermal stability of this joint is not appreciably degraded by such inserts, particularly if PFA is used as an insert. The method of the invention may be applied for joining together PTFE bodies of different shapes and dimensions. Formation of the butt joint is carried out in a particularly simple manner between bodies have a thickness of about 0.5 to 10 mm.

Apparatus for welding together PTFE bodies consists of clamping jaws, between which the bodies to be joined together are held and heating elements arranged in the space between the clamping jaws for heating the abutting surfaces. The chamber which is formed by the heating elements and the unheated PTFE sections inhibits of restrains volume expansion of the heated PTFE zone on both sides of the abutting surfaces. Due to the inhibition or blocking of the thermal expansion, compression stresses of an order of magnitude suitable for making butt joints are produced in the abutting surfaces and are maintained for the time required to make the joint. By supplying a force additionally acting on the abutting surfaces, the pressure in the welding zone can be kept constant, or changed in accordance with a predetermined program. Pressure changes may be made by movable heating elements acted upon by a predetermined force and/or by loaded clamping jaws which are movable in a guide perpendicularly to the abutting surface. The heating elements are advantageously designed as heater ribbons or as hollow bodies filled with heating media.

Thus, shaped bodies of PTFE of the most varied geometrical shapes such as plates, rods foil, hollow cylinders, hollow cones and the like may be joined in a simple matter by butt joints with a close material bond. The shape of the abutting surfaces and the layout of the welded seam may be quite varied. The abutting surfaces can intersect the surface of the body at an angle or may be of concave or convex shape or have arbitrary profiles. The welded seams may lengthwise, be straight or curved. The abutting surfaces may be serrated over the entire length of the welded seam or only in some sections, Advantages of the joints made in accordance with the invention are very favorable quotient, called the welding factor, of the tensile strength of the joint determined at room temperature and the tensile strength of the solid raw material; the density of the welded seam; and its resistance against corrosive substances. The welding factor of the joint is approximately 1. For welded hollow bodies, it is important that the low permeability of the starting material should not be increased appreciably by the welded seams. Further advantages of the method are the excellent reproducibility, uniform seam quality and, finally the simple handling.

Referring to the drawing and in particular to FIG. 1, numerals 1 and 2 are two plate-shaped PTFE bodies which touch each other at the butt joint 3 and are clamped between the clamping jaws 7 and 8. Between the pairs of clamping jaws are arranged, symmetrically to the joint 3 and above and below the PTFE bodies 1 and 2, a heating element 4 and a heating element 5. The heating elements 4 and 5 are insulated thermally and electrically from the yokes 9 by spacers 6. The distance of the two heating elements 4 and 5 is chosen so that the PTFE, which expands when heated to the welding temperature, rests against both heating elements.

Thus, the distance between the two heating elements 4 and 5 is greater than the thickness of the cold PTFE but is slightly less than the thickness of the expanded PTFE with the result that the expanded PTFE is in contact with and exerts pressure against elements 4 and 5. The pressure built up in the joint 3 is taken up by the yokes 9 and the cold sections of the PTFE body between the heating ribbons and the clamping jaws. The arrows A graphically represent the clamping forces acting on the jaws 7 and 8. In this manner the welded joint may be controlled to have substantially the same thickness as the PTFE body.

In FIG. 2, the heating element 5 with the insulating spacer 6 is movably supported and the force B pushes the heating elements onto the butt joint 3. The force B, which may be generated by springs, hydraulically or by weights, may be applied to the abutting surfaces, for example, while the PTFE is being warmed up. The force B can be controlled, i.e. varied in pressure, so that for each temperature the desired pressure can be exerted.

In the embodiment of FIG. 3, the clamping jaws are movable in the direction toward the butt joint 3. This is particularly desired because when the welded joint cools down structural stresses are frequently set up, which stresses are relieved by moving the clamping jaws in the direction toward the butt joint 3. Failure to move the clamping jaws may result in a defective weld.

FIG. 4 shows movable heating elements and clamping jaws, which permit matching or balancing the pressure C on the heated section on both sides of the butt joint and varying and regulating the pressure C to that desired for each temperature.

The following examples illustrate the present invention:

EXAMPLE 1

Pared PTFE foils, 4 mm thick, provided for lining a funnel with mouth diameters of 500 mm 1400 mm and a height of 1000 mm were cut to size and the edges planed off. The pared foil was then clamped in a device illustrated in FIG. 4 in such a manner that the abutting surfaces touching each other were parallel to the jaws and were about the same distance away from each pair of jaws, a distance of about 19 mm. A zone about 15 mm wide on both sides of the butt joint was then heated by the applied heating elements to a temperature of about 400° C. and a pressure of about 120 H/cm$^2$ was applied to the abutting surfaces by moving the clamping jaws. The pressure and the temperature were maintained for 45 min. and the welded seam was subsequently cooled under pressure to room temperature. The strength and elongation determined by a tensile test were, compared to unwelded PTFE:

Breaking strength >0.85
Breaking elongation >0.95.

EXAMPLE 2

For lining a hollow cylinder with a length of 1000 mm and a diameter of 1400 mm, pared PTFE foil 5 mm thick was used. The foils were clamped in a device as illustrated in FIG. 3, the butt joint being centered and parallel relative to the clamping jaws. Between the two butt surfaces, a foil of PFA was inserted and between the PTFE parts and the adjoining heating elements, one foil each of asbestos paper. The welding zone was now heated over a width of about 15 mm to a temperature of about 350° C. and the pressure developed of about 20 N/cm$^2$ was maintained for a period of time of 5 minutes. The testing to the welded seam showed the following values (referred to unwelded PTFE):

Breaking strength >0.90
Breaking elongation >0.95

There are claimed:

1. Method for joining together edge surfaces of polytetrafluoroethylene material by a butt joint which comprises the steps of:
   (a) placing the polytetrafluoroethylene edges to be joined in a butting relationship in a confining chamber defined as an upper heating element above a strip of the polytetrafluoroethylene material along both sides of the abutting surfaces, a lower heating element below the strip of polytetrafluoroethylene material along both sides of the abutting surface, wherein the distance between the two heating elements is greater than the thickness of the polytetrafluoroethylene strip before heating and less than the expanded polytetrafluoroethylene during heating, and a clamping jaw on each side of the abutting surfaces holding the polytetrafluoroethylene material adjacent the strip of material between said upper and lower heating elements;
   (b) pressing together the abutting surfaces in the absence of other material therebetween;
   (c) heating the abutting surfaces to a temperature above the crystallite melting temperature of the polytetrafluoroethylene;
   (d) generating a pressure within said chamber by the expending polytetrafluoroethylene which braces itself against the chamber walls;
   (e) maintaining the heated abutting surfaces at a temperature between 340° and 430° C. at a contact pressure and welding time of 60 to 300N/cm$^2$ and 10 to 120 minutes, respectively, to weld abutting surfaces; and wherein the heated polytetrafluoroethylene material is cooled down and during the cooling-down phase an additional pressure is exerted on the butt joint by moving at least one clamping jaw in a direction toward the butt joint.

* * * * *